(12) United States Patent
Brandt et al.

(10) Patent No.: US 11,346,472 B2
(45) Date of Patent: May 31, 2022

(54) COUPLING AND CIRCUMFERENTIAL GROOVE SHAPE

(71) Applicant: Victaulic Company, Easton, PA (US)

(72) Inventors: Justin P Brandt, Flemington, NJ (US); Anthony J Cuvo, Coopersburg, PA (US); Philip W Bancroft, Belvidere, NJ (US)

(73) Assignee: Victaulic Company, Easton, PA (US)

( * ) Notice: Subject to any disclaimer, the term of this patent is extended or adjusted under 35 U.S.C. 154(b) by 597 days.

(21) Appl. No.: 16/184,347

(22) Filed: Nov. 8, 2018

(65) Prior Publication Data

US 2019/0078709 A1 Mar. 14, 2019

Related U.S. Application Data

(62) Division of application No. 15/697,701, filed on Sep. 7, 2017, now Pat. No. 10,190,707.

(60) Provisional application No. 62/449,765, filed on Jan. 24, 2017.

(51) Int. Cl.
*F16L 17/04* (2006.01)
*F16L 21/08* (2006.01)
*B21D 1/00* (2006.01)

(52) U.S. Cl.
CPC .............. *F16L 17/04* (2013.01); *B21D 1/00* (2013.01); *F16L 21/08* (2013.01)

(58) Field of Classification Search
CPC .................................. F16L 17/04; F16L 21/08
USPC ......................................... 285/112, 420, 367
See application file for complete search history.

(56) References Cited

U.S. PATENT DOCUMENTS

| 2,821,415 | A | 1/1958 | Race, Jr. |
| 3,015,502 | A | 1/1962 | Frost et al. |
| 3,054,629 | A | 9/1962 | Piatek |
| 3,453,010 | A | 7/1969 | Gerretz et al. |
| 3,986,736 | A | 10/1976 | Takagi et al. |
| 6,196,039 | B1 * | 3/2001 | Williams ............... B21D 17/04 72/105 |
| 8,267,432 | B2 | 9/2012 | Madara |

(Continued)

FOREIGN PATENT DOCUMENTS

CN 2556454 Y * 6/2003
EP 0265141 A1 * 4/1988 .............. F16L 17/04

(Continued)

*Primary Examiner* — Matthew Troutman
*Assistant Examiner* — Fannie C Kee
(74) *Attorney, Agent, or Firm* — Ballard Spahr LLP

(57) ABSTRACT

Pipe elements have circumferential grooves. The grooves have a first side surface contiguous with a first floor surface. The first side surface and the first floor surface together subtend a first 90° circular arc when viewed in cross section. The grooves also have a second side surface contiguous with a second floor surface. The second side surface is in spaced relation to and in facing relation with the first side surface. The second side surface and the second floor surface together subtend a second 90° circular arc when viewed in cross section. A third floor surface is contiguous with both the first and second floor surfaces and is a flat surface. A coupling used to connect the pipe elements has arcuate projections which engage the grooves of the pipe elements. The arcuate projections have a semi-circular cross section. Relief grooves are positioned adjacent to each arcuate projection.

16 Claims, 6 Drawing Sheets

(56) References Cited

U.S. PATENT DOCUMENTS

| | | |
|---|---|---|
| 9,951,896 B2 | 4/2018 | Svetlik |
| 2005/0212284 A1 | 9/2005 | Dole |
| 2005/0212296 A1 | 9/2005 | Dole |
| 2005/0242585 A1 | 11/2005 | Dole |
| 2006/0197344 A1 | 9/2006 | Henry |
| 2010/0289257 A1 | 11/2010 | Madara |
| 2012/0256415 A1 | 10/2012 | Dole |
| 2012/0256416 A1 | 10/2012 | Ikeda et al. |
| 2015/0285417 A1 | 10/2015 | Beagen, Jr. |
| 2018/0163905 A1 | 6/2018 | Ohnemus et al. |
| 2018/0163906 A1 | 6/2018 | Ohnemus et al. |

FOREIGN PATENT DOCUMENTS

| | | | | |
|---|---|---|---|---|
| EP | 3072605 | 9/2016 | | |
| JP | 11241794 A | * | 9/1999 | ............. F16L 17/04 |
| JP | 2001227680 | 8/2001 | | |
| JP | 2011122698 | 6/2011 | | |
| JP | 2014529510 | 11/2014 | | |
| SU | 1702877 | 12/1991 | | |
| WO | 2013033134 | 3/2013 | | |

* cited by examiner

COUPLING AND CIRCUMFERENTIAL GROOVE SHAPE

CROSS REFERENCE TO RELATED APPLICATION

This application is based upon and claims priority to U.S. application Ser. No. 15/697,701, filed Sep. 7, 2017, which is based upon and claims priority to U.S. Provisional Application No. 62/449,765 filed Jan. 24, 2017 both applications hereby incorporated by reference.

FIELD OF THE INVENTION

This invention relates to pipe couplings for connecting polymeric pipe elements and pipe elements connected by pipe couplings.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Pipe elements are vulnerable to failure at joints where two or more pipe elements are connected. Failure at a joint may be caused by applied forces inducing stresses in pipe elements or couplings that exceed the yield strength of the material forming the pipe elements or coupling, at much lower loads applied cyclically which induces fatigue failure, or when bending forces add additional stresses. Regardless of the failure mode, stress concentrations in the pipe elements can play a major role in limiting the performance of pipe joints, especially mechanical pipe joints assembled from polymeric pipes, as some polymeric materials are sensitive to stress concentrations.

Stress concentrations may be a factor, for example, when polymeric pipe elements are joined by mechanical couplings, commonly made of metal, having arcuate projections, known as "keys", which engage circumferential grooves in the pipe elements. The grooves, whether formed by machining operations or cold worked (roll-grooved), will have regions of stress concentration in the "corners" of the groove, where the sides of the groove meet the floor of the groove, such regions being near or adjacent to the location of the engagement of the key within the groove, and thus, where forces and stresses are transferred across the joint by the coupling. Further, known engineering considerations governing the groove geometry and the groove/key contact tend to increase stress in the groove corners, these considerations including the known need to maximize the height of the engagement between the sides of the keys and the sides of the groove for performance purposes while minimizing the depth of the groove, and, for polymeric pipe, minimizing or eliminating compressive forces applied by the key to the bottom of the groove, which act to increase stress at the groove corners. Where other forces, such as bending forces, are applied to the joint and carried only by the key/groove interface, stress is further increased at the groove corners. At those corners, stress concentrations are formed as a natural consequence of the sharp corner or small radius present where the two surfaces meet. Such stress concentrations are exacerbated by the need, in practical pipe couplings, to account for manufacturing tolerances on the coupling and the pipe elements themselves. These manufacturing tolerances create geometric variability in each component, the accommodation of which limits the degree to which coupling designers can reduce the effect of stress concentrations. The increased stress in the groove corners and the stress concentrations naturally occurring there promote the formation of small cracks in some polymer pipe elements, which can lead to an ultimate failure under high applied loads, or fatigue failure under stress inducing cyclic loads. There is clearly an advantage to reducing or eliminating the increased stresses in the corners of the grooves in polymeric pipes and stress concentrations at those locations, including by reducing the effects of geometric variations on the key/groove interface.

SUMMARY

The invention concerns a coupling for connecting pipe elements. In one example embodiment the coupling comprises a plurality of segments attached to one another end to end surrounding a central space. Adjustable attachment members are positioned at opposite ends of each segment for attaching the segments to one another. First and second arcuate projections are positioned respectively on opposite sides of each segment. Each arcuate projection faces an axis which extends through the central space and which extends lengthwise along each segment. Each arcuate section has a semi-circular cross section taken parallel to the axis. The semi-circular cross section extends over at least a portion of the arcuate projection.

In an example embodiment, at least one of the arcuate projections comprises at least one clearance relief region positioned adjacent to an end of one of the segments. Further by way of example, the at least one clearance relief region comprises a surface of increasing radius of curvature on the one arcuate projection. The surface of increasing radius of curvature faces the axis.

In an example embodiment, the coupling comprises no more than two segments. In a further example embodiment, each one of the arcuate projections on each of the segments comprises a first and a second clearance relief region positioned adjacent respectively to a first and a second end of each of the segments. In another example, each one of the first and second clearance relief regions comprises a surface of increasing radius of curvature. The surfaces of increasing radius of curvature face the axis.

An example coupling further comprises a first and a second relief groove. The first relief groove is positioned adjacent to the first arcuate projection. The second relief groove is positioned adjacent to the second arcuate projection. Each relief groove extends lengthwise along each segment and faces the axis. An example embodiment further comprises a first shoulder positioned adjacent to the first relief groove. The first relief groove is between the first shoulder and the first arcuate projection. A second shoulder is positioned adjacent to the second relief groove. The second relief groove is between the second shoulder and the second arcuate projection. The first and second shoulders are adapted to contact the pipe elements.

In an example embodiment, each one of the first and second shoulders has a radius of curvature approximately equal to a radius of curvature of an outer surface of the pipe elements. An example embodiment may further comprise at least one attachment member located at an end of each segment. In a specific example embodiment, the attachment members comprise lugs extending outwardly from each segment. Each lug defines a hole for receiving a fastener. Another example comprises attachment members located at opposite ends of each segment. By way of example, the attachment members comprise lugs extending outwardly from opposite ends of each segment. Each lug defines a hole for receiving a fastener.

An example coupling further comprises a ring seal positioned within the central space. The ring seal has an outer surface supporting the segments in spaced apart relation sufficient to permit insertion of the pipe elements into the central space. The attachment members hold the segments in contact with the ring seal.

The invention also encompasses, in combination, a pipe element and a coupling for joining the pipe element to another pipe element. In an example embodiment the pipe element comprises a sidewall surrounding and defining a bore. The sidewall has an outer surface facing away from the bore. A groove is positioned in the outer surface of the sidewall. The groove extends circumferentially around the bore. By way of example the groove comprises a first side surface contiguous with a first floor surface. The first side surface and the first floor surface together subtend a first 90° circular arc when viewed in cross section taken parallel to an axis extending coaxially through the bore. A second side surface is contiguous with a second floor surface. The second side surface is in spaced relation to and faces the first side surface. The second side surface and the second floor surface together subtend a second 90° circular arc when viewed in cross section taken parallel to the axis extending coaxially through the bore. An example coupling comprises a plurality of segments attached to one another end to end surrounding a central space. Adjustable attachment members are positioned at opposite ends of each segment for attaching the segments to one another. First and second arcuate projections are positioned respectively on opposite sides of each segment. Each arcuate projection faces an axis which extends through the central space and which extends lengthwise along each segment. Each arcuate section has a semicircular cross section taken parallel to the axis. The semicircular cross section extends over at least a portion of the arcuate projection.

An example combination further comprises a third floor surface contiguous with both the first and second floor surfaces. The third floor surface may comprise a flat surface. By way of example, the groove has a semi-circular cross sectional shape comprising the first 90° circular arc and the second 90° circular arc. In an example embodiment, at least one of the arcuate projections comprises at least one clearance relief region positioned adjacent to an end of one of the segments. By way of example, the at least one clearance relief region comprises a surface of increasing radius of curvature on the one arcuate projection. The surface of increasing radius of curvature faces the axis.

An example coupling may comprise no more than two segments.

By way of example, each one of the arcuate projections on each of the segments may comprise a first and a second clearance relief region positioned adjacent respectively to a first and a second end of each of the segments. In an example embodiment, each one of the first and second clearance relief regions comprises a surface of increasing radius of curvature. The surfaces of increasing radius of curvature face the axis.

An example combination may further comprise a first and a second relief groove. The first relief groove is positioned adjacent to the first arcuate projection. The second relief groove is positioned adjacent to the second arcuate projection. Each relief groove extends lengthwise along each segment and faces the axis.

An example combination may further comprise a first shoulder positioned adjacent to the first relief groove. The first relief groove is between the first shoulder and the first arcuate projection. A second shoulder is positioned adjacent to the second relief groove. The second relief groove is between the second shoulder and the second arcuate projection. The first and second shoulders are adapted to contact the pipe elements.

In an example combination, each one of the first and second shoulders has a radius of curvature approximately equal to a radius of curvature of an outer surface of the pipe elements. By way of example, the combination may further comprise at least one attachment member located at an end of each segment. In a specific example embodiment, the attachment members comprise lugs extending outwardly from each segment. Each lug defines a hole for receiving a fastener. By way of example, attachment members are located at opposite ends of each segment.

In an example embodiment, the attachment members comprise lugs extending outwardly from opposite ends of each segment. Each attachment lug defines a hole for receiving a fastener. An example embodiment may further comprise a ring seal positioned within the central space. The ring seal has an outer surface supporting the segments in spaced apart relation sufficient to permit insertion of the pipe elements into the central space. The attachment members hold the segments in contact with the ring seal.

The invention also encompasses a pipe element for use with a pipe coupling comprising a plurality of segments attached to one another end to end surrounding a central space for receiving the pipe element. In an example embodiment, at least a first arcuate projection is positioned on one side of the coupling and facing an axis extending through the central space. The arcuate projection has a semi-circular cross section taken parallel to the axis. An example pipe element comprises a sidewall surrounding and defining a bore. The sidewall has an outer surface facing away from the bore. A groove is positioned in the outer surface of the sidewall. The groove extends circumferentially around the bore. In an example embodiment the groove comprises a first side surface contiguous with a first floor surface. The first side surface and the first floor surface together subtend a first 90° circular arc when viewed in cross section taken parallel to an axis extending coaxially through the bore. A second side surface is contiguous with a second floor surface. The second side surface is in spaced relation to and faces the first side surface. The second side surface and the second floor surface together subtend a second 90° circular arc when viewed in cross section taken parallel to the axis extending coaxially through the bore.

An example pipe element may further comprise a third floor surface contiguous with both the first and second floor surfaces. The third floor surface may comprise a flat surface. By way of example, the groove has a semi-circular cross sectional shape comprising the first 90° circular arc and the second 90° circular arc.

DETAILED DESCRIPTION

Figure 1:
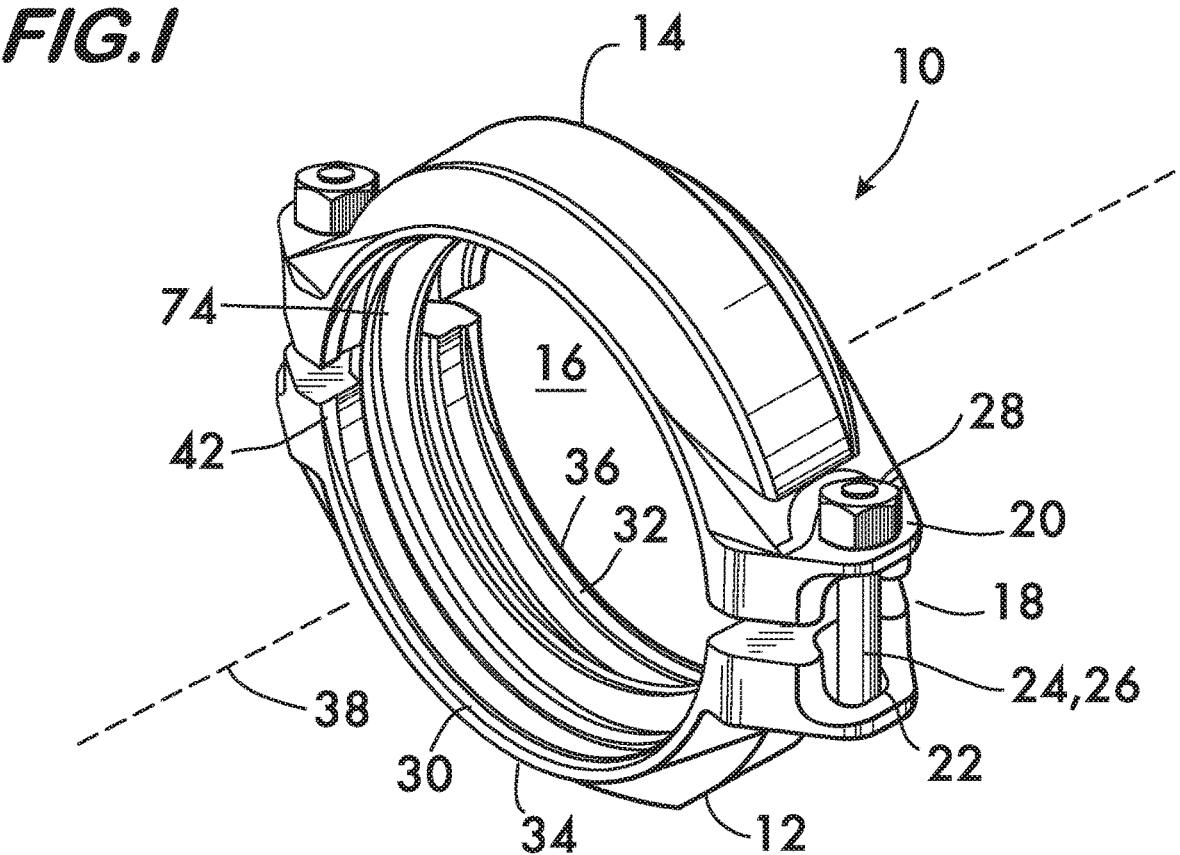
FIG. 1 is an isometric view of an example coupling according to the invention.

FIG. 1 shows an example pipe coupling 10 according to the invention. Coupling 10 comprises a plurality of segments, in this example two segments 12 and 14, attached to one another end to end surrounding a central space 16. To effect attachment of the segments 12 and 14, adjustable attachment members 18 are positioned at opposite ends of each segment. In this example embodiment attachment members 18 comprise lugs 20 which extend radially outwardly from the ends of segments 12 and 14. Lugs 20 on segment 12 are in facing relation with lugs 20 on segment 14 and have through holes 22 which receive adjustable fasteners 24, in this example bolts 26 and nuts 28. Tightening of the fasteners 24 draws the segments toward one another and into engagement with pipe elements to be connected as described below. Other embodiments may have attachment members 18 only at one end of each segment, the opposite ends being joined, for example, using a hinge.

Figure 2:
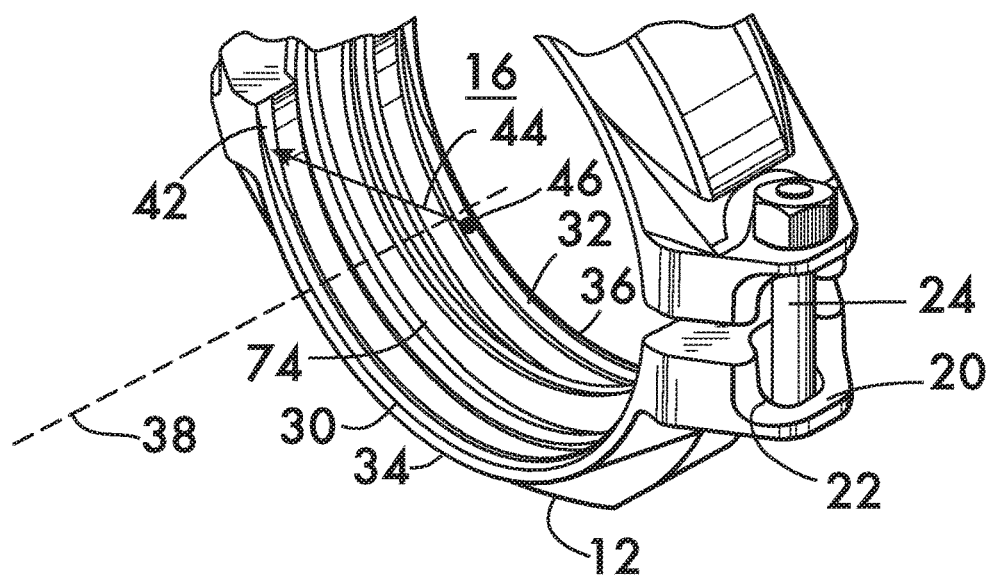
FIG. 2 is an isometric view of a portion of the coupling shown in FIG. 1.
Figure 3:
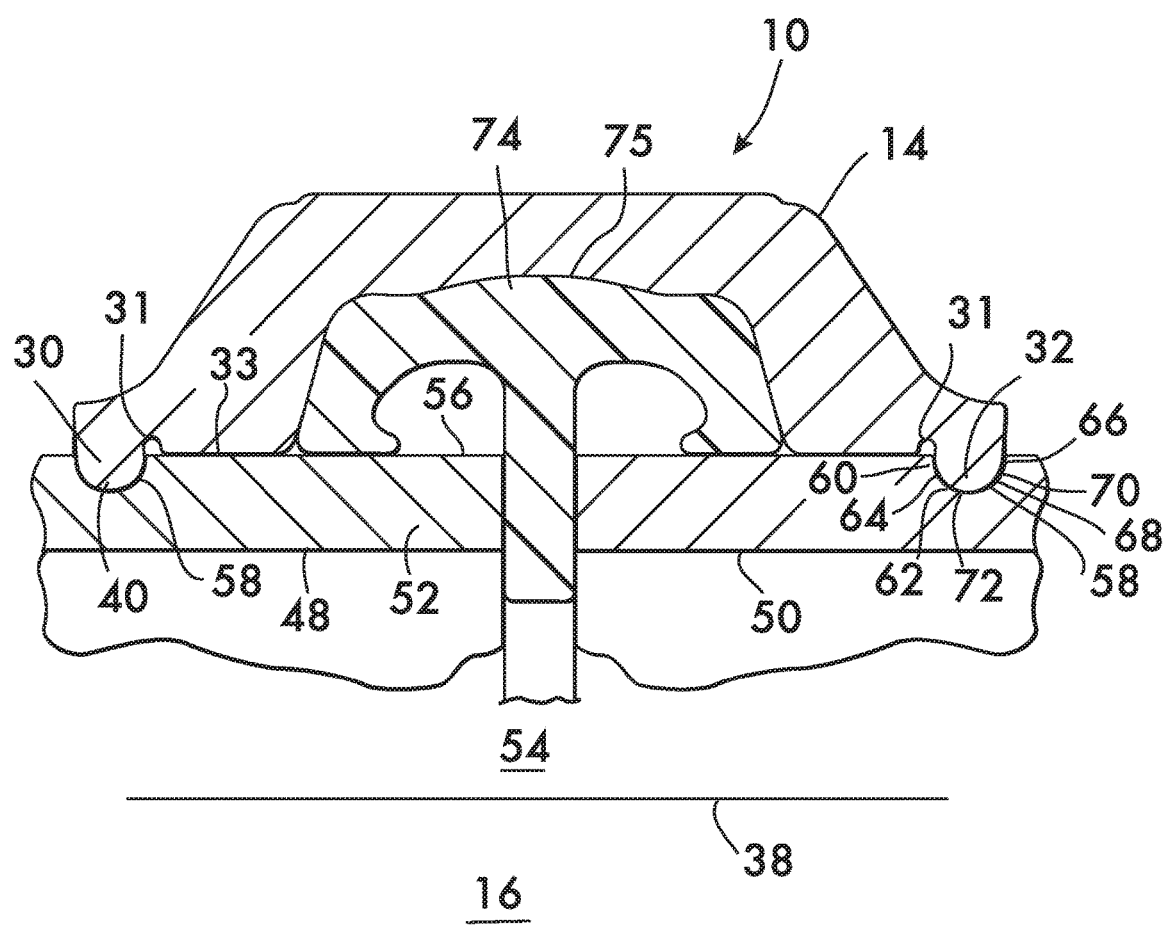
FIG. 3 is a partial longitudinal sectional view of a joint formed by the coupling shown in FIG. 1 and example pipe elements according to the invention.

As shown in FIG. 2, each segment 12 and 14 (12 shown) has first and second arcuate projections 30 and 32 positioned on opposite sides 34 and 36 of each segment 12 and 14. Each arcuate projection 30, 32 faces an axis 38 which extends through the central space 16. The arcuate projections 30 and 32 extend lengthwise along each segment 12 and 14. As shown in FIG. 3, each arcuate projection 30, 32 on segments 12 and 14 (14 shown) has a semi-circular cross section 40 when the section is taken parallel to the axis 38. Adjacent to each arcuate projection 30, 32, are relief grooves 31. As shown in FIG. 2, the semi-circular cross sections 40 extend over at least a portion of each arcuate projection 30, 32. In the example coupling shown, the arcuate projections 30 and 32 also comprise regions of clearance relief 42. Such clearance relief regions provide clearance between the couplings 12 and 14 and the pipe elements upon insertion of the pipe elements into a pre-assembled coupling (described below). In the example shown, the clearance relief regions comprise surfaces 42 of increasing radius of curvature 44. The radii 44 of the surfaces 42 are measured from the center of curvature 46 of the arcuate projections 30 and 32 having the semi-circular cross section. Surfaces 42 are positioned adjacent to the ends of segments 12 and 14 and present a flat surface facing the axis 38 where the projections 30 and 32 would otherwise interfere with the pipe elements upon insertion.

Figure 3A:
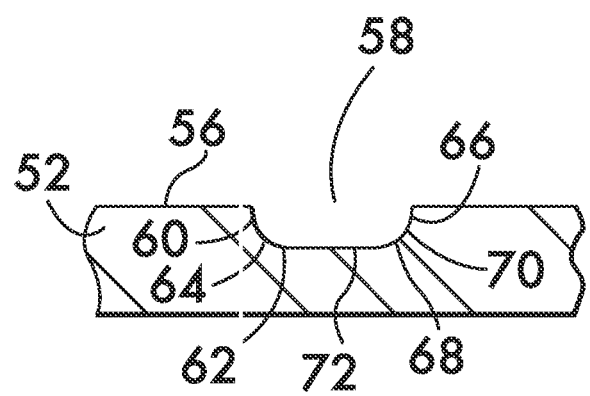
FIGS. 3A and 3B are partial sectional views of example pipe element grooves according to the invention shown on an enlarged scale.
Figure 3B:
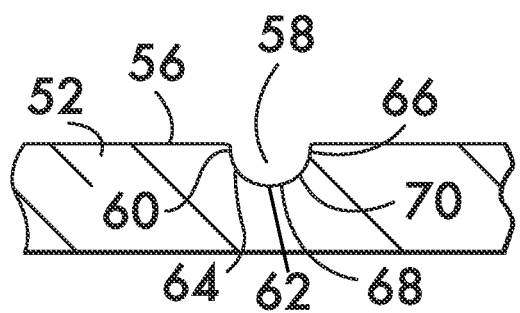
Figure 4:
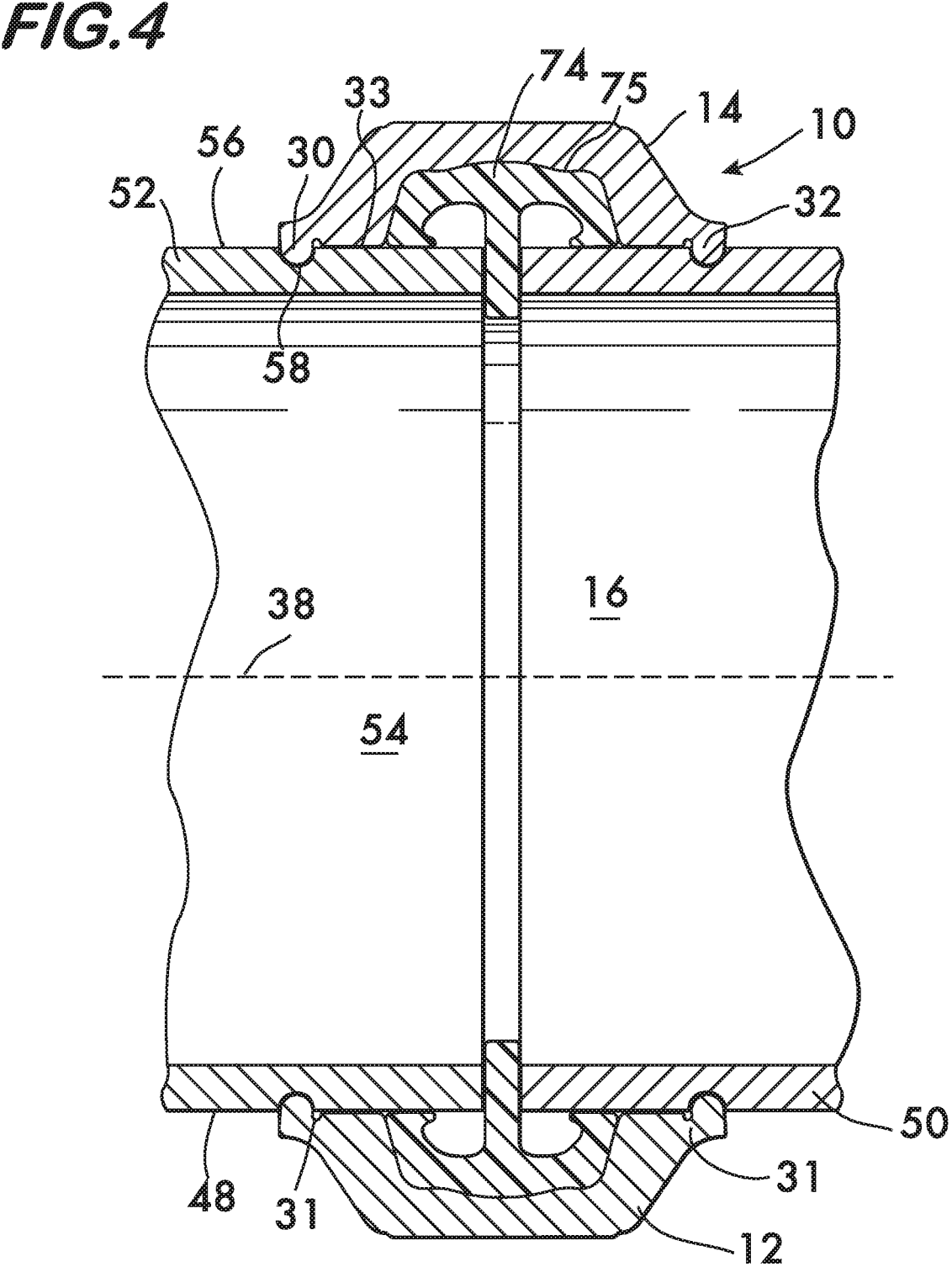
FIG. 4 is a longitudinal sectional view of a pipe joint using an example coupling and example pipe elements according to the invention.

As further shown in FIGS. 3 and 4, the invention also encompasses pipe elements 48 and 50 connected by the coupling 10. In this example each pipe element 48 and 50 comprises a sidewall 52 surrounding and defining a bore 54. Sidewall 52 further has an outer surface 56 which faces away from the bore 54. A groove 58 is positioned in the outer surface 56 of the sidewall 52. Groove 58 extends circumferentially around the bore 54. In the example embodiment shown in FIGS. 3 and 3A, groove 58 comprises a first side surface 60 contiguous with a first floor surface 62. When viewed in cross section taken parallel to axis 38 (extending coaxially through bore 54), together the first side surface 60 and first floor surface 62 subtend a first 90° circular arc 64. Groove 58 further comprises a second side surface 66 contiguous with a second floor surface 68. Second side surface 66 is in spaced relation to and faces the first side surface 60. When viewed in cross section taken parallel to axis 38, together the second side surface 66 and second floor surface 68 subtend a second 90° circular arc 70. In this example embodiment, groove 58 further comprises a third floor surface 72. Third floor surface 72 is contiguous with both the first and second floor surfaces 62 and 68 and comprises a flat surface, or a surface having an infinite radius of curvature. FIG. 3B illustrates another embodiment of groove 58 comprising the first side surface 60 contiguous with the first floor surface 62 which together subtend the first 90° circular arc 64. Groove 58 of FIG. 3B further comprises the second side surface 66 contiguous with a second floor surface 68 which together subtend the second 90° circular arc 70. In this embodiment, the groove 58 has a semi-circular cross sectional shape comprising the first 90° circular arc 64 and said second 90° circular arc 70.

Groove 58, when formed in either embodiment, will significantly reduce or even eliminate regions of stress concentration traditionally associated with circumferential grooves in pipe elements. A concomitant increase in joint performance, specifically ultimate strength and fatigue life, is in fact observed in experiments conducted on chlorinated polyvinyl chloride (CPVC) pipe elements having grooves with cross sections as described for groove 58.

Figure 3C:
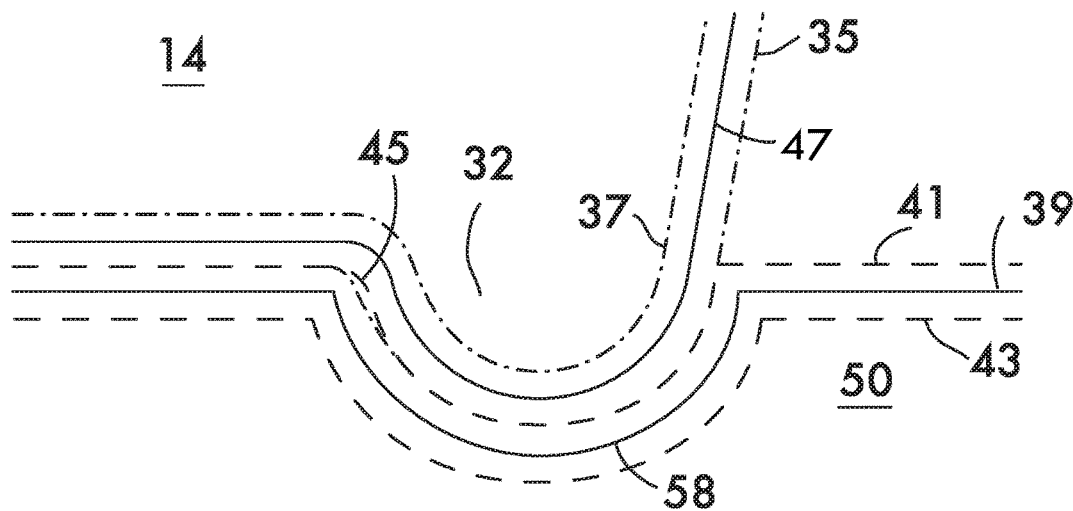
FIGS. 3C and 3D are schematic views which illustrate the effect of manufacturing tolerances on the interface of the coupling and pipe elements.
Figure 3D:
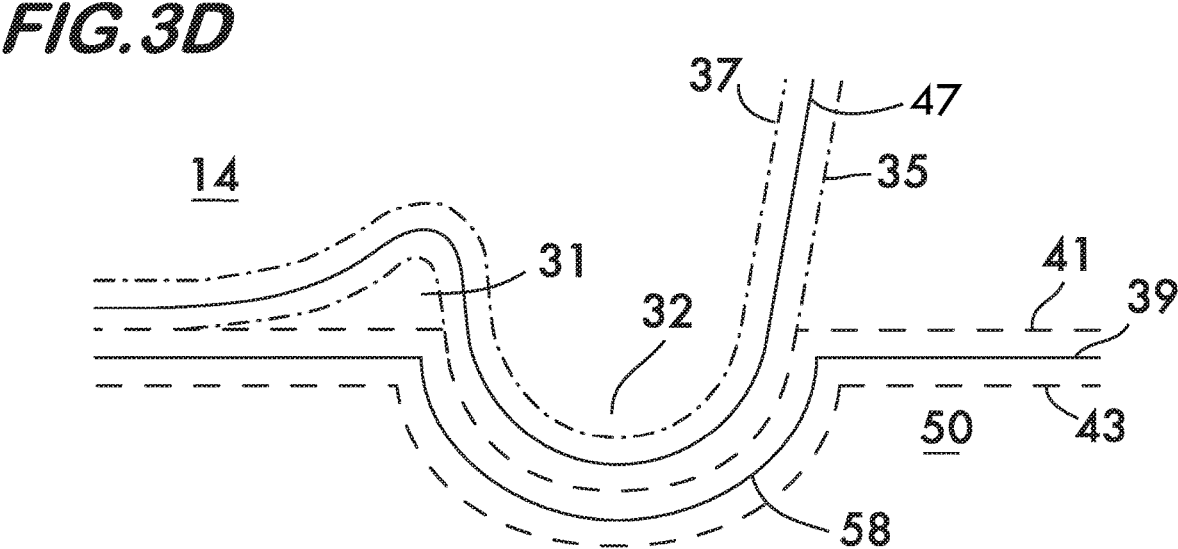

The effect of manufacturing tolerances on the key/groove interface is shown by FIGS. 3C and 3D. Each segment (segment 14 shown) has an intended profile 47, as well as an acceptable upper tolerance limit 35 and an acceptable lower tolerance limit 37 in order to allow for practical manufacturing processes. Similarly, the pipe elements (pipe element 50 shown) have an intended profile 39, acceptable upper tolerance limit 41, and acceptable lower tolerance limit 43. Design of mechanical joints must accommodate these tolerance windows without interference. However, undesired interference between the projections 30 and 32 and the grooves 58 will occur when both the coupling and the pipe elements are at their acceptable upper tolerance limits. Relief grooves 31 (see FIGS. 3 and 3D) eliminate the zone of greatest interference, zone 45, shown in FIG. 3C for a coupling at the upper tolerance limit 35 and a pipe element at the upper tolerance limit 41. The fit between arcuate projection 32 and groove 58 in this case is such that the upper tolerance limit line 35 of the coupling is shown interfering with (i.e. passing beneath) the upper tolerance limit line 41 of the pipe element. However, the presence of the relief groove (FIG. 3D) eliminates this interference and allows for a more consistent fit of the arcuate projections, 30, 32 within the groove 58. Absent relief grooves 31, zones of interference 45 would either cause additional stresses to be created in pipe elements 48, 50 as the coupling 10, which is manufactured from metal, attempts to crush the corner of polymeric pipe elements 48, 50 within the zone, or would prevent the arcuate projections 30 and 32 from seating as deeply in groove 58 as possible.

Figure 5:
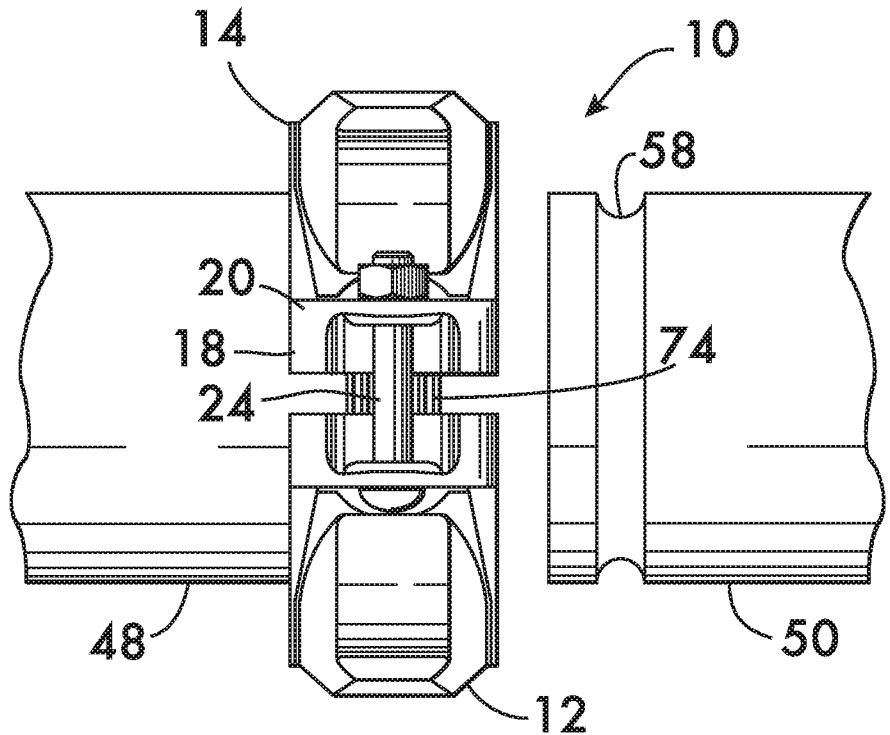
FIGS. 5 and 6 illustrate an example method of forming the pipe joint shown in FIGS. 3 and 4 using an example coupling and example pipe elements according to the invention.
Figure 6:
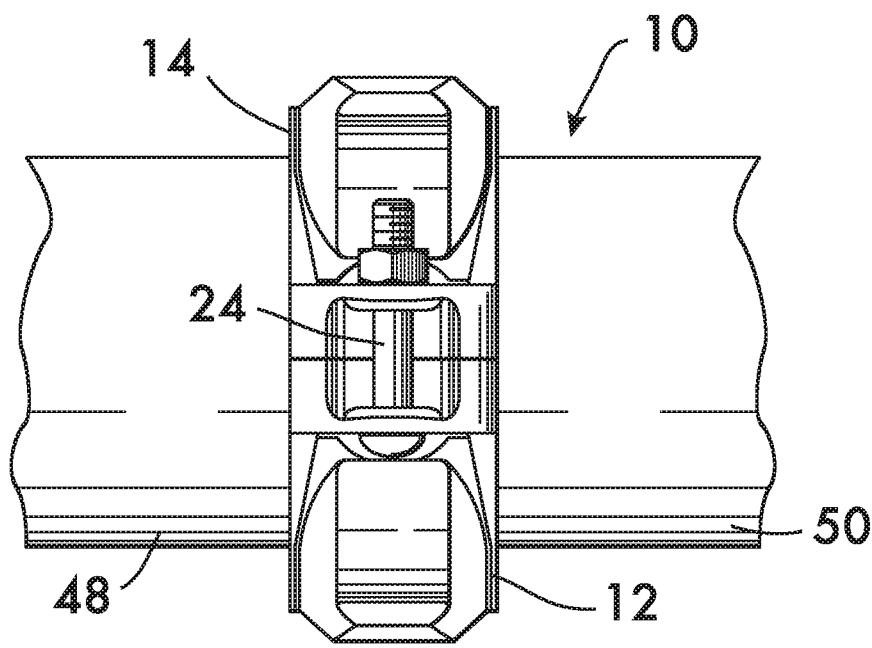

Operation of the combination coupling and pipe element is illustrated in FIGS. 5 and 6. As shown in FIG. 5 (see also FIG. 1), the coupling 10 is shown in a "pre-assembled state" as it would be supplied from the factory or distributor. In the pre-assembled state, the segments 12 and 14 are attached to one another end to end by the adjustable attachment members 18 (in this example lugs 20 and fasteners 24), but also supported in spaced apart relation by a ring seal 74 positioned between them. The ring seal 74 is formed of an elastomer such as ethylene propylene diene monomer (EPDM) and, when undeformed, has an outer surface 75 (see FIG. 4) sized to support the segments 12 and 14 in spaced apart relation sufficient to permit insertion of pipe elements 48 and 50 into the central space 16 without disassembling the coupling 10. The adjustable attachment members 18 hold the segments 12 and 14 in contact with the ring seal 74 (see FIGS. 1 and 5) in the pre-assembled state and may be adjusted to slightly compress the ring seal 74 so that the segments are not loose. Insertion of the pipe elements, as illustrated in FIG. 5, is aided by the clearance relief regions 42, in this example, surfaces of increasing radius of curvature 44 (see FIGS. 1 and 2) located adjacent to the ends of segments 12 and 14. The surfaces of increasing radius of curvature 44 provide clearance in the regions of the arcuate projections 30 and 32 which might otherwise interfere with the pipe elements 48 and 50 upon insertion.

As shown in FIG. 6, the fasteners 24 are tightened to draw the segments 12 and 14 toward one another and draw the arcuate projections into engagement with the grooves 58 in the pipe elements 48 and 50 and form a pipe joint. As shown in FIG. 4, relief grooves 31 reduce or eliminate the adverse effects of the combined tolerances of the pipe elements 48, 50 and segments 12, 14, allowing increased fatigue life and maximum load when tensile loads are applied as well as when tolerance conditions depart from nominal. The relief grooves 31 also prevent the interference (which would otherwise be present) from adding stress to pipe elements 48, 50. As the segments 12 and 14 are drawn together the ring seal 74 is compressed and deformed between the segments and the pipe elements 48 and 50 and forms a fluid tight joint. Relief grooves 31 further permit an increase in the bending rigidity of the joint formed. Bending rigidity is provided by contact between the pipe elements and the segment's shoulders 33 which have a radius of curvature approximately equal to the radius of curvature of the pipe element's outer surface. The relief grooves 31 avoid the interference at corner 45 (see FIG. 3D) and permit full contact between the pipe elements and the shoulders 33, thereby increasing the bending rigidity of the joint formed.

Joints formed by the combination couplings and pipe elements according to the invention have demonstrated both improved fatigue life and increased maximum pressure performance over prior art designs.

What is claimed is:

1. In combination, a pipe element and a coupling for joining said pipe element to another pipe element, said pipe element comprising:
    a sidewall surrounding and defining a bore, said sidewall having an outer surface facing away from said bore;
    a groove positioned in said outer surface of said sidewall, said groove extending circumferentially around said bore, said groove comprising:
    a first side surface contiguous with a first floor surface, said first side surface and said first floor surface together subtending a first 90° circular arc when viewed in cross section taken parallel to an axis extending coaxially through said bore;
    a second side surface contiguous with a second floor surface, said second side surface being in spaced relation to and facing said first side surface, said second side surface and said second floor surface together subtending a second 90° circular arc when viewed in cross section taken parallel to said axis extending coaxially through said bore; and
    said coupling comprising:
    a plurality of segments attached to one another end to end surrounding a central space;
    adjustable attachment members positioned at opposite ends of each said segment for attaching said segments to one another;
    first and second arcuate projections positioned respectively on opposite sides of each said segment, each said arcuate projection facing an axis extending through said central space and extending lengthwise along each said segment, each said arcuate projection having a semi-circular cross section taken parallel to said axis, said semi-circular cross section extending over at least a portion of said arcuate projection, each said arcuate projection being engageable with said pipe elements.

2. The combination according to claim 1, further comprising a third floor surface contiguous with both said first and second floor surfaces, said third floor surface comprising a flat surface.

3. The combination according to claim 1, wherein said groove has a semi-circular cross sectional shape comprising said first 90° circular arc and said second 90° circular arc.

4. The combination according to claim 1, wherein at least one of said arcuate projections comprises at least one clearance relief region positioned adjacent to an end of one of said segments.

5. The combination according to claim 4, wherein said at least one clearance relief region comprises a surface of increasing radius of curvature on said one arcuate projection, said surface of increasing radius of curvature facing said axis.

6. The combination according to claim 1, wherein said coupling comprises no more than two said segments.

7. The combination according to claim 6, wherein each one of said arcuate projections on each of said segments comprises a first and a second clearance relief region positioned adjacent respectively to a first and a second end of each of said segments.

8. The combination according to claim 7, wherein each one of said first and second clearance relief regions comprises a surface of increasing radius of curvature, said surfaces of increasing radius of curvature facing said axis.

9. The combination according to claim 6, further comprising at least one attachment member located at an end of each said segment.

10. The combination according to claim 9, wherein said attachment members comprise lugs extending outwardly from each said segment, each said lug defining a hole for receiving a fastener.

11. The combination according to claim 6, further comprising attachment members located at opposite ends of each said segment.

12. The combination according to claim 11, wherein said attachment members comprise lugs extending outwardly from opposite ends of each said segment, each said attachment lug defining a hole for receiving a fastener.

13. The combination according to claim 11, further comprising a ring seal positioned within said central space, said ring seal having an outer surface supporting said segments in spaced apart relation sufficient to permit insertion of said pipe elements into said central space, said attachment members holding said segments in contact with said ring seal.

14. The combination according to claim 1, further comprising a first and a second relief groove, said first relief groove positioned adjacent to said first arcuate projection, said second relief groove positioned adjacent to said second arcuate projection, each said relief groove extending lengthwise along each said segment and facing said axis.

15. The combination according to claim 14, further comprising:
- a first shoulder positioned adjacent to said first relief groove, said first relief groove being between said first shoulder and said first arcuate projection;
- a second shoulder positioned adjacent to said second relief groove, said second relief groove being between said second shoulder and said second arcuate projection, wherein
- said first and second shoulders are adapted to contact said pipe elements.

16. The combination according to claim 15, wherein each one of said first and second shoulders has a radius of curvature approximately equal to a radius of curvature of an outer surface of said pipe elements.

\* \* \* \* \*